(12) United States Patent
Kayser

(10) Patent No.: US 8,506,089 B2
(45) Date of Patent: Aug. 13, 2013

(54) AVIAN DETERRENT FOR GLASS USING PROJECTED UV LIGHT

(76) Inventor: Kenneth W. Kayser, Catawba, VA (US)

( * ) Notice: Subject to any disclaimer, the term of this patent is extended or adjusted under 35 U.S.C. 154(b) by 342 days.

(21) Appl. No.: 12/963,038

(22) Filed: Dec. 8, 2010

(65) Prior Publication Data

US 2011/0134397 A1    Jun. 9, 2011

Related U.S. Application Data

(60) Provisional application No. 61/267,980, filed on Dec. 9, 2009.

(51) Int. Cl.
*G03B 21/00* (2006.01)
*A01K 37/00* (2006.01)

(52) U.S. Cl.
USPC ............................................. 353/62; 119/713

(58) Field of Classification Search
USPC ................... 353/62; 427/402; 119/712, 713
See application file for complete search history.

(56) References Cited

U.S. PATENT DOCUMENTS 2,959,094 A * 11/1960 Kosma ............................. 352/87
5,930,032 A    7/1999 Maruyama et al.
2006/0164252 A1 * 7/2006 Richmond ..................... 340/606
2007/0190343 A1 * 8/2007 Arkles ........................... 428/447
2009/0065715 A1 * 3/2009 Wainright ................. 250/504 R
2010/0236497 A1 * 9/2010 Philiben et al. ............... 119/712

FOREIGN PATENT DOCUMENTS

EP         1110450         3/2002

OTHER PUBLICATIONS

City of Toronto Green Development Standard: Bird-Friendly Development Guidelines, Mar. 2007, 46 pages.

* cited by examiner

*Primary Examiner* — Thanh Luu
*Assistant Examiner* — Renee Naphas
(74) *Attorney, Agent, or Firm* — Nixon Peabody LLP

(57) ABSTRACT

An apparatus for preventing bird collisions with a window including a UV light source, a mask, and a first lens configured to direct UV light from the UV light source through the mask. The mask is at least partially transparent to UV light and includes a pattern that is at least partially opaque to UV light. The UV light passing through the mask contains the pattern. The pattern-containing UV light is projected onto a pane of glass to form a UV image visible to birds corresponding to the pattern on the pane. The image is configured to deter birds from flying into the pane of glass.

18 Claims, 3 Drawing Sheets

AVIAN DETERRENT FOR GLASS USING PROJECTED UV LIGHT

REFERENCE TO RELATED APPLICATIONS

This application is related to and claims priority to U.S. Provisional Patent Application Ser. No. 61/267,980, filed Dec. 9, 2009, which is incorporated herein in its entirety.

FIELD OF THE INVENTION

The invention relates to avian deterrents for windows, and more particularly projecting ultraviolet (UV) light onto windows to deter birds from colliding with windows.

BACKGROUND OF THE INVENTION

Every year around a billion birds—an estimated 5 percent of the country's bird population—die each year by crashing into windows they cannot see, according to Professor Daniel Klem, Jr., an ornithologist at Muhlenberg College in Pennsylvania who has spent over 30 years studying bird collisions. Migratory birds, including songbirds whose populations are already on the decline, crash into glass in especially large numbers. See Bina Venkataraman, Fatal Reflections: As 'green' architecture advances, glass buildings pose hazard to birds, Globe Newspaper Company, Dec. 15, 2008. While environmentalists often express concern about the effects of oil spills, wind turbines, and cell phone towers, Professor Klem says that only habitat destruction kills more birds than window collisions. See Joann Loviglio, Plate glass blamed for a billion bird deaths a year, Associated Press, Feb. 2, 2004.

Two properties of glass that make it so appealing—the way it reflects light and allows humans to see through it—are the very reasons that birds crash into it. They see mirror-images of trees and sky they want to fly toward, or they may see food, water, or habitat inside or beyond the windows. See Bina Venkataraman, Fatal Reflections, supra.

The danger of bird collisions is increasing as cities erect buildings that emphasize natural light, and as improvements in the energy efficiency of glass increase its use. If not patterned, tinted, or used in small panes, low-e glass has a mirror-like quality. Green roofs reflected on surrounding buildings can lure birds into walls.

Current solutions for avoiding bird strikes on both residential and commercial buildings are not effective. Home owners are told to relocated bird feeders; cover windows on opposite walls with paper or cardboard; attach stickers, netting, or dead tree branches to outside glass; install awnings; or configure windows to tilt downwards. The remedies for saving the birds that enthusiasts want to watch generally have the adverse effect of preventing the enthusiasts from seeing the birds.

Although the cities of Toronto and Chicago and the New York City Audubon Society have published bird safe building guidelines, commercial builders have not been able to help birds without either interfering with the view from inside or substantially increasing costs. Some buildings have utilized bird-safe design recommendations that encourage features such as fritted or patterned glass and ceramic rods placed over the windows. The Illinois Institute of Technology's student center in Chicago has a dot matrix pattern in its glass that makes it less transparent and reflective to birds but is hard for people to see through unless they are standing at a distance from the windows. The German company Arnold Glas has developed a striped glass that costs about 30 percent more than other high performing glass but still obstructs the view.

It is desirable to make windows identifiable for flying birds. Birds are able to see light in the ultraviolet (UV) range, specifically in a wavelength band from about 300 to 400 nm that is invisible to people. According to Prof. Klem, research indicates that covering windows on the outside surface with visual cues whose elements are apart two inches horizontally to four inches vertically eliminates birds strikes altogether. Patterns can be any object, including circles, lines, stripes, hawk silhouettes, or UV-reflecting leaves. It is the spacing that is most important. See Daniel Klem, Jr., Windows: an unintended fatal hazard for birds, available at www.savingbirds.org. It is also desirable that the cues are not visible to humans.

SUMMARY OF THE INVENTION

According to the invention, an ultraviolet (UV) light pattern—invisible to the human eye—can be projected on a flat window surface. A UV LED can pulse light at UV frequencies only to illuminate the outside surface of window glass. The present invention provides an inexpensive solution for new or existing homes and office buildings.

For example, an apparatus for preventing bird collisions with a window includes a UV light source, a mask, and a first lens configured to direct UV light from the UV light source through the mask. The mask is at least partially transparent to UV light and includes a pattern that is at least partially opaque to UV light. The UV light passing through the mask contains the pattern. The pattern-containing UV light is projected onto a pane of glass to form a UV image visible to birds corresponding to the pattern on the pane of glass. The image is configured to deter birds from flying into the pane of glass.

The apparatus may be powered by a photovoltaic (solar) cell or battery or may plug into an outlet, for example using a power circuit electromagnetically coupled to the UV light source through the pane of glass. The UV light emitted will not adversely affect people because it will be blocked by the glass.

According to another aspect of the invention, a method of preventing bird collisions with a pane of glass includes generating UV light at a UV light source, directing the UV light through a mask containing a pattern with a first lens, and projecting the pattern-containing UV light onto a pane of glass to form on the pane of glass an image visible to birds configured to deter birds from flying into the pane of glass. The mask is at least partially transparent to UV light and the pattern is at least partially opaque to UV light.

BRIEF DESCRIPTION OF THE DRAWINGS

The invention may best be understood by reference to the following description taken in conjunction with the accompanying drawings, in which.

DETAILED DESCRIPTION OF THE ILLUSTRATED EMBODIMENTS

Although the invention will be described in connection with certain preferred embodiments, it will be understood that the invention is not limited to those particular embodiments.

On the contrary, the invention is intended to cover all alternatives, modifications, and equivalent arrangements as may be included within the spirit and scope of the invention as defined by the appended claims.

Figure 1:
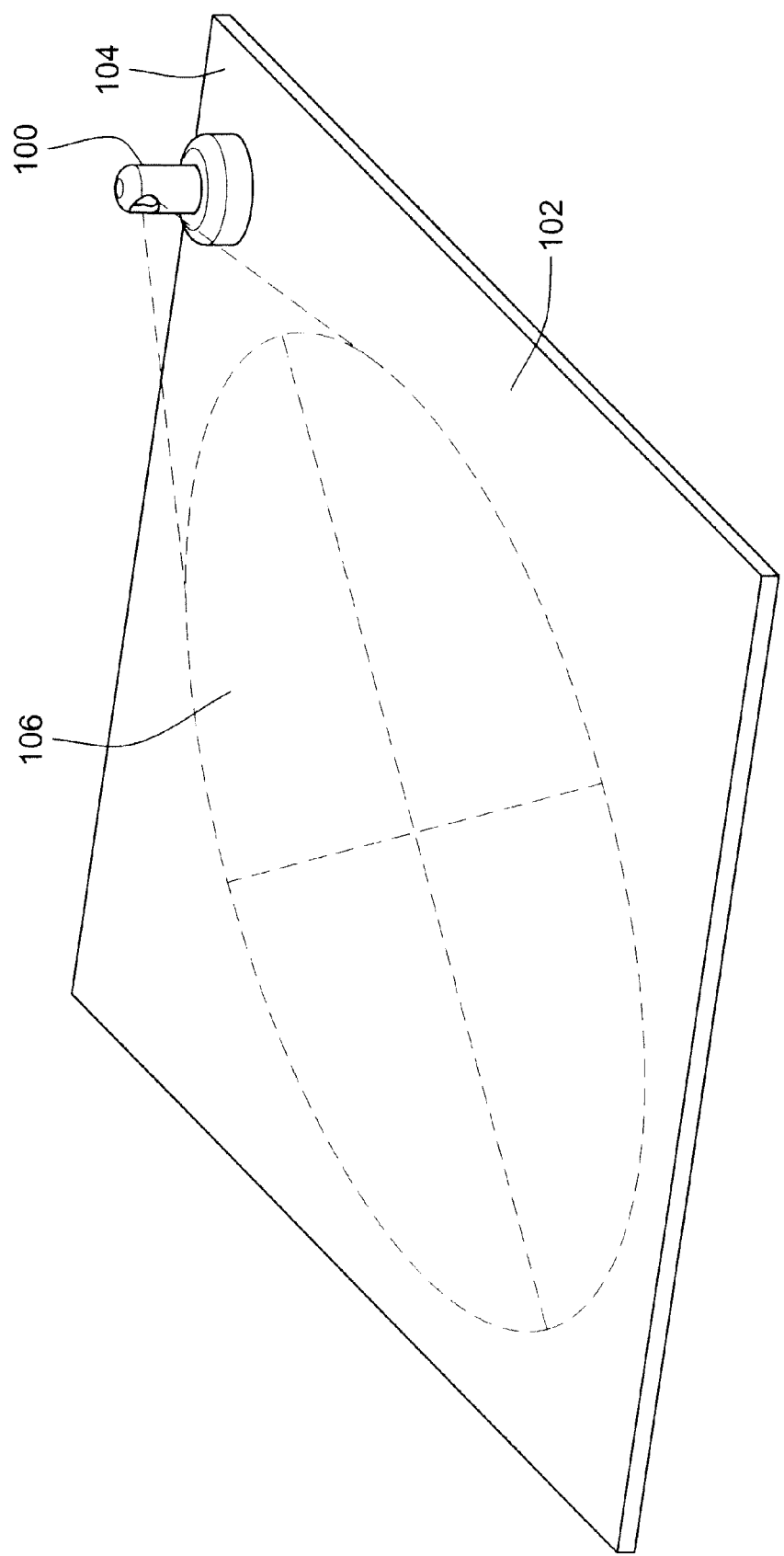
FIG. 1 is perspective drawing of a UV light projector mounted to a pane of glass.

FIG. 1 illustrates an ultraviolet (UV) light projector 100 mounted to a pane of glass 102. The pane of glass 102 can be a window contained in a structure, such as a home or office building. The UV light projector 100 can be mounted to the window using adhesive, using suction cups connected to the UV light projector 100, or using other suitable fasteners, such as screws, bolts, or rivets. The UV light projector 100 can be mounted in a corner 104 of the pane of glass 102 or its support frame so as to minimize the portion of the pane of glass 102 that is obscured by the UV light projector 100. Additionally, the particular corner of the pane of glass 102 for mounting of the UV light projector 100 can be chosen based on the preferred view of an observer looking out through the pane 102.

The UV light projector 100 projects a UV light image containing a pattern 106 onto the surface of the pane of glass 102. The UV light projector 100 projects the UV light at a low enough incident angle to the pane of glass 102 such that the pattern-containing image 106 is reflected off of an exterior surface of the pane of glass 102 in order to be visible to birds. The UV light projector 100 can be configured to project the pattern-containing UV light image 106 over substantially the entire surface, or a selected portion of the pane of glass 102. For glass that attenuates UV light, as in most office buildings, the projector 100 is preferably mounted to project UV light onto the exterior surface of the pane of glass 102.

Figure 2:
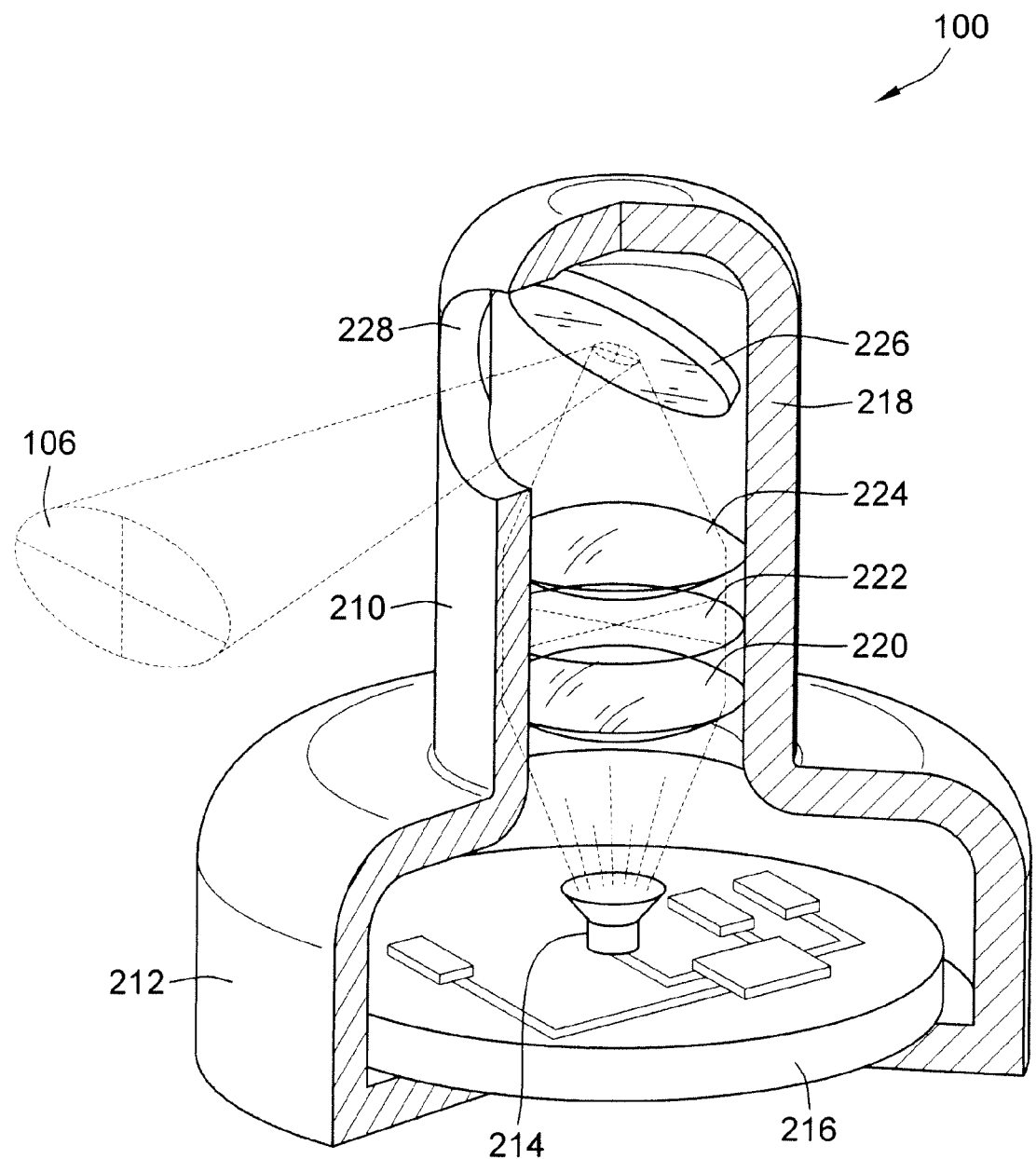
FIG. 2 is a cutaway view of a UV light projector.

FIG. 2 shows a cutaway view of the UV light projector 100. The UV light projector includes a housing 210 that contains the components of the UV light projector 100. A base portion 212 of the housing 210 contains a UV light source 214 mounted on a printed circuit board (PCB) 216. The UV light source 214 can be, for example, a high intensity light emitting diode (LED) that emits light in the UV spectrum (e.g., a wavelength of 300-400 nm) when powered by an electric current.

The housing 210 also includes a column portion 218 that houses a first lens 220, a mask 222, a second lens 224, and a mirror 226. UV light from the UV light source 214 is directed toward the first lens 220. The first lens 220 collimates the light to shine through a mask 222. The mask 222 is at least partially transparent to UV light, and includes a pattern printed onto the mask that is at least partially opaque to UV light. The pattern can be dots, stars, or other interference patterns, or chosen to be a picture that when recognized by birds, will cause birds to fly away (e.g., a picture of a hawk). The mask 222 can be constructed as a photo mask on a substrate such as film onto which the pattern is printed, e.g., by using a photographic process. The pattern on the mask 222 is scaled geometrically, taking into account the size of the glass pane, to produce on the glass pane the image 106 with a pattern including appropriate spacings. The UV light passing through the mask 222 contains the pattern.

The pattern-containing UV light passing through the mask then passes through the second lens 224, which directs the pattern-containing UV light toward the mirror 226. The pattern-containing UV light striking the mirror 226 crosses over and diverges, spreading the pattern onto the surface of the pane of glass. Alternately, the second lens 224 can be configured to cause the pattern-containing UV light to diverge prior to striking the mirror 226.

The first lens 220, the mask 222, and the second lens 224 can be configured to share the same optical axis. The mirror 226 can be positioned at an angle to the optical axis of the first lens 220, the mask 222, and the second lens 224. The housing 210 includes a hole or aperture 228 positioned opposite the mirror 226 such that the pattern-containing light reflected by the mirror 226 is projected outward through the hole 228. The hole 228 can open, or can be made of a material transparent to UV light, such as glass. Making the hole 228 of a UV light-transparent material allows the components of the UV light projector to remain enclosed and sealed within the housing 210, protecting the components from the elements.

The pattern-containing UV light is projected through the hole 228 to form the pattern-containing image 106 on the surface of the glass pane (shown in FIG. 1). The shape and power of the second lens 224, along with the distance between the second lens 224 and the mirror 226 can affect the size of the image 106 projected onto the glass pane. The angle of the mirror 226 relative to the optical axis of the lenses 220, 224 can be chosen to project the image 106 on the glass pane at an angle of incidence low enough to cause the UV light of the pattern 106 to be reflected off of the exterior surface of the glass pane, and thus be visible to birds. The angle of the mirror 226, in conjunction with the second lens 224, can influence the size and location of the image 106 on the glass pane. The mirror 226 can also be shaped, for example to a convex shape, to further affect the size of the image 106 on the glass pane.

Alternatively, the UV light source can be mounted facing the pane of glass at a low angle of incidence to the glass pane such that a mirror is not necessary to direct the UV light toward the glass pane. A first lens, mask, and second lens, sharing an optical axis of the angle of incidence to the glass pane can collimate the UV light, embed the pattern into the UV light, and diverge the pattern-containing UV light onto the glass pane. In a further alternative, a single lens diverges the UV light, which passes through a mask prior to reflecting off of an exterior surface of the glass pane.

Because a high-intensity LED can be chosen as the UV light source 214, and PCBs can be manufactured to a small scale, the UV light source 214 and PCB 216 can be made very small. The lenses 220, 218 and the mirror 226 can also be made very small. Because the size of the image 106 projected on the glass pane can be determined by the power of the lens 224 and the angle of incidence of the pattern-containing light projected by the mirror 228, the image 106 projected on the glass pane can be large, and can substantially cover the glass pane even though the UV light projector 100 can be made relatively small and compact.

Figure 3:
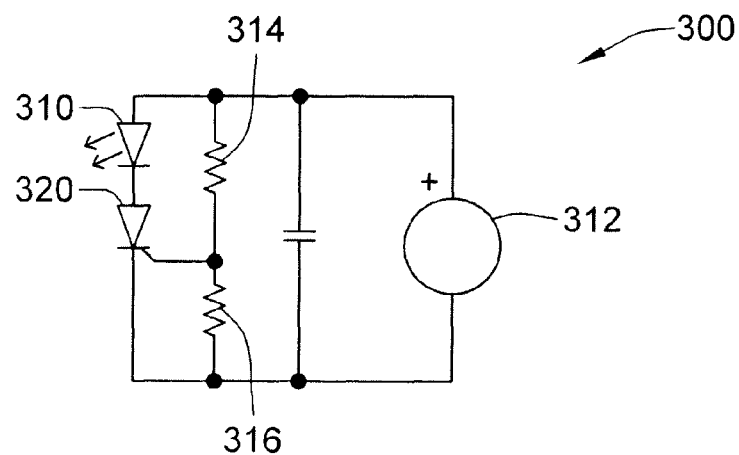
FIG. 3 is circuit diagram of a power supply coupled to a UV light projector.

The UV light source 214 can be powered by a variety of electrical power sources. For example, FIG. 3 shows a diagram of a power supply circuit 300 for powering the UV light source. The UV light source, shown as LED 310, is coupled to and powered by a power supply 312. The power supply 312 can be a battery. The power supply 312 can also be a photovoltaic cell mounted to the housing, mounted to the exterior surface of the pane of glass, or mounted to the exterior surface of the structure containing the pane of glass. A resistor divider comprising resistors 314 and 316 regulates the voltage drop across the LED 310. Because birds' eyes have persistence, the LED 310 can be pulsed for higher efficiency. If the LED 310 is pulsed at a high enough frequency, birds will not notice any flicker. A capacitor 318 can be chosen, along with the resistors 314, 316, to provide an alternating current to the LED 310 with a frequency determined by the RC constant of the resistors 314, 316 and the capacitor 318. A diode 320 is coupled in series with the LED 310, and is configured to rectify the current passing through the LED 310. The UV light emitted by the LED 310 is pulsed at the frequency determined by the RC constant.

Figure 4:
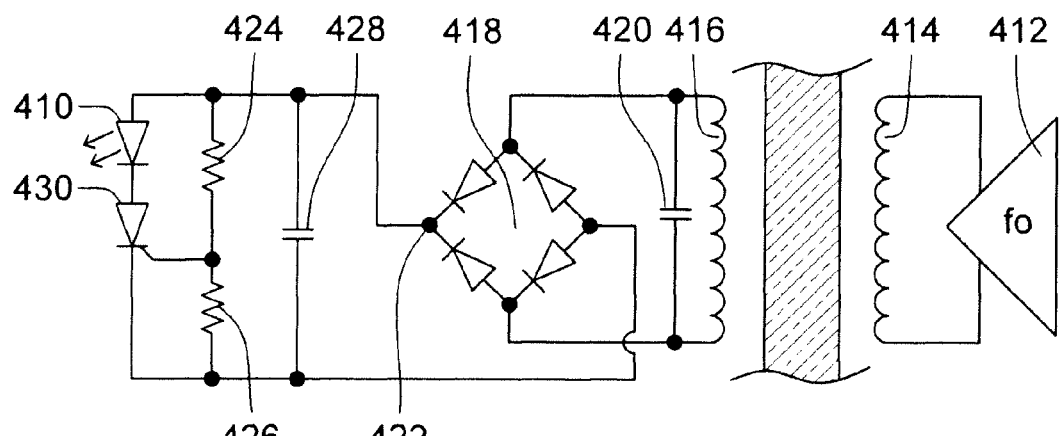
FIG. 4 is circuit diagram of a UV light projector coupled electromagnetically to a power supply.

Alternatively, the UV light source can be powered using a power supply on the other side of the pane of glass from the UV light projector, e.g., inside of the building. FIG. 4 shows a diagram of a power supply circuit 400 for powering the UV light source. The UV light source is shown as an LED 410. The power supply 412 is shown on the opposite side of the pane of glass 102 from the LED 410. The power supply 412 can be a standard alternating current (AC) supplied by a wall outlet. The power supply 412 supplies electrical current to a first coil of wire 414. The AC current passing through the coil 414 induces a magnetic flux that passes through the pane of glass 102. The magnetic flux is received by a second coil of wire 416, and an AC electric current is induced in the second coil 416. The AC electric current induced in the second coil 416 is rectified with a diode bridge 418 and a capacitor 420 to produce a direct current (DC) at the output 422 of the diode bridge 418.

A resistor divider comprising resistors 424 and 426 regulates the voltage drop across the LED 410. Once again, to increase efficiency, a capacitor 428 can be chosen, along with the resistors 424, 426, to provide an alternating current to the LED 410 with a frequency determined by the RC constant of the resistors 424, 426 and the capacitor 428. A diode 430 is coupled in series with the LED 410, and is configured to rectify the current passing through the LED 410. The UV light emitted by the LED 410 is pulsed at the frequency determined by the RC constant.

As can be seen from the above, a small, compact UV light projector can project a pattern-containing image onto a pane of glass. The UV light pattern reflected off of the glass pane can be seen by birds, but not humans, and can thus deter birds without obstructing a person's view out of the pane of glass. The UV light projector can be made small enough such that the device itself does not obstruct the view out of the window. Moreover, the UV light projector can be made and operated cheaply, making it practical for use on buildings with large numbers of windows. For example, the UV light projectors can be used on homes, office buildings, and skyscrapers with large numbers of glass windows, and can be located on windows that have the highest probability of bird collisions (e.g., windows on lower floors at the levels birds ordinarily fly, and on which landscape such as trees is ordinarily reflected). Because the light source of the UV light projector can be a highly-efficient LED, power can be supplied more cheaply. Because the LED can be pulsed without detracting from the effectiveness, the projector can be operated even more efficiently. As a result, batteries would need changing less frequently, and smaller and less expensive photovoltaic panels could be used. Moreover, because the UV light projector can be powered from a battery or a photovoltaic cell, either of which can be located along with the UV light projector outside of the building, or by a electromagnetically-coupled power source located inside of the building, the building itself does not need to be modified to accommodate the UV light projector. Because the UV light source is on the opposite side of the pane of glass from a human observer, and the glass used in windows typically blocks UV light, the UV light will not be harmful to people.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

The invention claimed is:

1. An apparatus for preventing bird collisions with a window, the apparatus comprising:
an ultraviolet (UV) light source;
a mask that is at least partially transparent to UV light including a pattern that is at least partially opaque to UV light;
a first lens configured to direct UV light from the UV light source through the mask, wherein the UV light passing through the mask contains the pattern, wherein the pattern-containing UV light is projected onto a pane of glass to form a UV image visible to birds corresponding to the pattern on the pane of glass and configured to deter birds from flying into the pane of glass;
a first circuit comprising a first coil coupled to the UV light source; and
a power circuit comprising a power supply and a second coil electromagnetically coupled to first circuit through the pane;
wherein the power supply supplies an electric current to the second coil to induce a magnetic flux in the second coil and the magnetic flux from the second coil induces an electric current in the first coil.

2. The apparatus of claim 1, wherein the UV light source comprises a light emitting diode (LED).

3. The apparatus of claim 2, further comprising a circuit for pulsing the LED.

4. The apparatus of claim 1, wherein the mask is a photo mask.

5. The apparatus of claim 1, further comprising a mirror configured to reflect the pattern-containing light passing through the mask onto an exterior surface of the pane of glass.

6. The apparatus of claim 5, further comprising a second lens configured to receive the pattern-containing UV light passing through the mask and direct the pattern-containing UV light onto the mirror.

7. The apparatus of claim 6, further comprising a housing, the housing comprising:
a base portion configured to contain a PCB upon which the UV light source is mounted;
a column portion configured to contain the first lens, the second lens, and the mirror; and
an opening transparent to UV light opposite the mirror configured to allow the projection of the pattern-containing UV light from the mirror onto the pane.

8. The apparatus of claim 7, wherein the housing is configured to be mounted to the pane of glass by a mounting means.

9. The apparatus of claim 1, further comprising at least one of a photovoltaic panel and a battery coupled to the UV light source to provide power to the UV light source.

10. A method of preventing bird collisions with a pane of glass, the method comprising:
generating ultraviolet (UV) light at a UV light source;
directing the UV light through a mask with a first lens, wherein the mask is at least partially transparent to UV light and includes a pattern that is at least partially opaque to UV light, the UV light passing through the mask including the pattern; and
projecting the pattern-containing UV light onto a pane of glass to form an image visible to birds configured to deter birds from flying into the pane of glass, wherein projecting the pattern-containing light from the mirror onto the pane of glass comprises projecting the pattern-containing UV light at an angle of incidence to an exterior surface of the pane low enough to cause the pattern-containing light to reflect off of the exterior surface of the pane.

11. The method of claim 10, wherein generating UV light comprises pulsing a high-intensity light emitting diode (LED).

12. The method of claim 10, wherein projecting the pattern-containing UV light onto the pane of glass comprises reflecting the pattern-containing UV light onto an exterior surface of the pane of glass with a mirror.

13. The method of claim 12, further comprising receiving the pattern-containing UV light from the mask at a second lens and directing the pattern-containing light onto the mirror.

14. The method of claim 13, further comprising:
supplying electric current from a power supply to a first coil of wire, the first coil of wire being positioned on a side of the pane of glass opposite of the UV light source;
receiving at a second coil of wire coupled to the UV light source a magnetic flux from the first coil of wire; and
inducing a current in the second coil of wire to provide power to the UV light source.

15. The method of claim 12, wherein the pattern of UV light projected onto the pane of glass covers the reflecting surface of the pane of glass.

16. The method of claim 10, further comprising providing power to the UV light source using a photovoltaic panel coupled to the UV light source.

17. The method of claim 10, further comprising providing power to the UV light source using a battery coupled to the UV light source.

18. The method of claim 10, wherein the mask is a photo mask.

* * * * *